(12) United States Patent
Sohn et al.

(10) Patent No.: US 11,131,651 B2
(45) Date of Patent: Sep. 28, 2021

(54) METHOD OF INSPECTING STRUCTURE AND INSPECTION SYSTEM

(71) Applicant: Korea Advanced Institute of Science and Technology, Daejeon (KR)

(72) Inventors: Hoon Sohn, Daejeon (KR); Peipei Liu, Daejeon (KR); Jinho Jang, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 222 days.

(21) Appl. No.: 16/427,389

(22) Filed: May 31, 2019

(65) Prior Publication Data

US 2020/0011839 A1 Jan. 9, 2020

(30) Foreign Application Priority Data

Jul. 3, 2018 (KR) ........................ 10-2018-0076827

(51) Int. Cl.
*G01N 29/24* (2006.01)
*G01N 21/17* (2006.01)
*G01N 29/34* (2006.01)
*G01N 29/12* (2006.01)

(52) U.S. Cl.
CPC ..... *G01N 29/2418* (2013.01); *G01N 21/1702* (2013.01); *G01N 29/12* (2013.01); *G01N 29/348* (2013.01); *G01N 2021/1706* (2013.01)

(58) Field of Classification Search
CPC .. G01N 29/2418; G01N 29/12; G01N 29/348; G01N 21/1702

USPC .......................................................... 73/643
See application file for complete search history.

(56) References Cited

FOREIGN PATENT DOCUMENTS

| JP | H 08-285823 A | 11/1996 |
| JP | 2013-088421 A | 5/2013 |
| KR | 10-2016-0032870 A | 3/2016 |
| KR | 10-2017-0135065 A | 12/2017 |
| KR | 20170135065 A | * 12/2017 |

* cited by examiner

*Primary Examiner* — Tarun Sinha
(74) *Attorney, Agent, or Firm* — Daly, Crowley, Mofford & Durkee, LLP

(57) ABSTRACT

In a method of inspecting a structure, a first ultrasonic signal generated from a target structure by a first laser beam is received. The first ultrasonic signal is generated by providing the first laser beam generated from a first excitation unit to the target structure. A second ultrasonic signal generated from the target structure by a second laser beam different from the first laser beam is received. The second ultrasonic signal is generated by providing the second laser beam generated from a second excitation unit to the target structure. A third ultrasonic signal generated from the target structure by the first and second laser beams is received. The third ultrasonic signal is generated by simultaneously providing the first and second laser beams to the target structure. It is determined whether the target structure is damaged based on first, second and third ultrasonic frequency spectra that are obtained by converting the first, second and third ultrasonic signals, respectively.

12 Claims, 26 Drawing Sheets

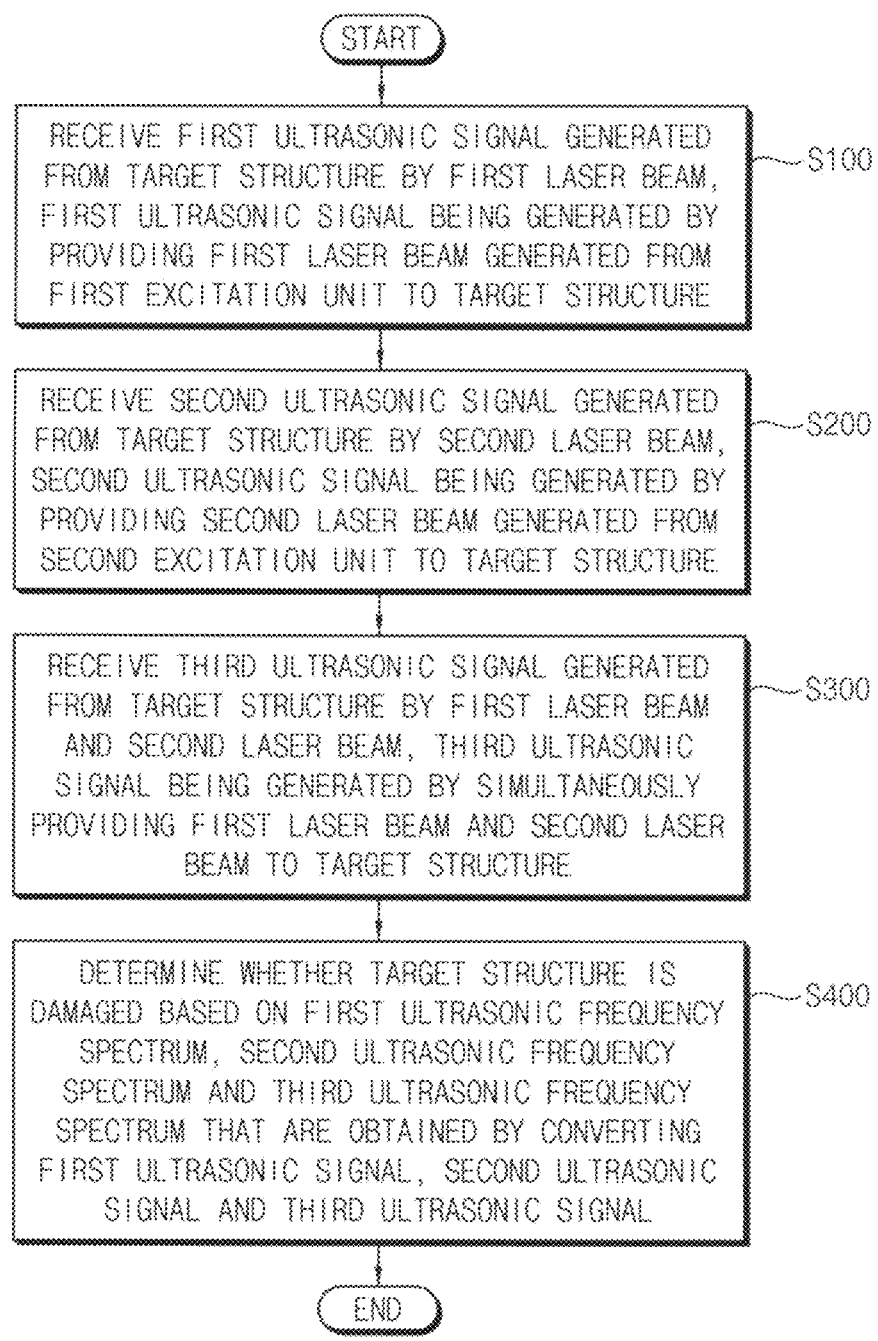

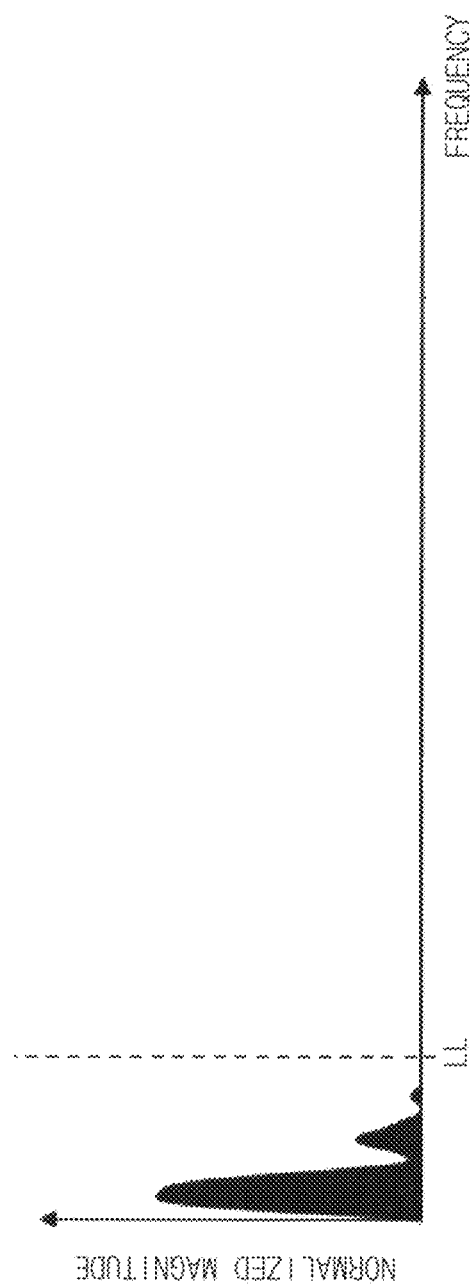

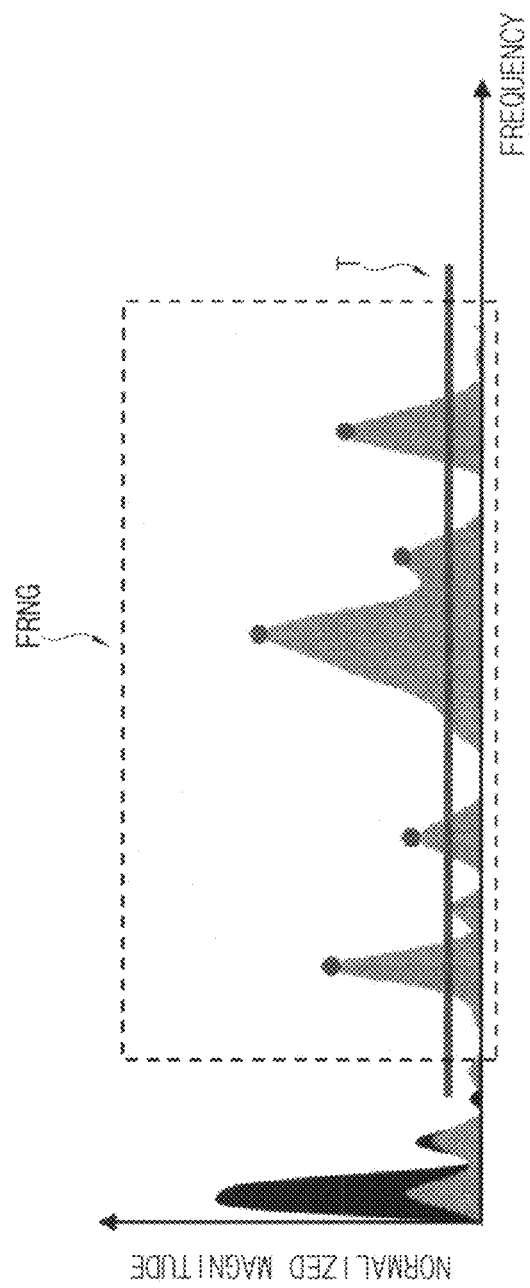

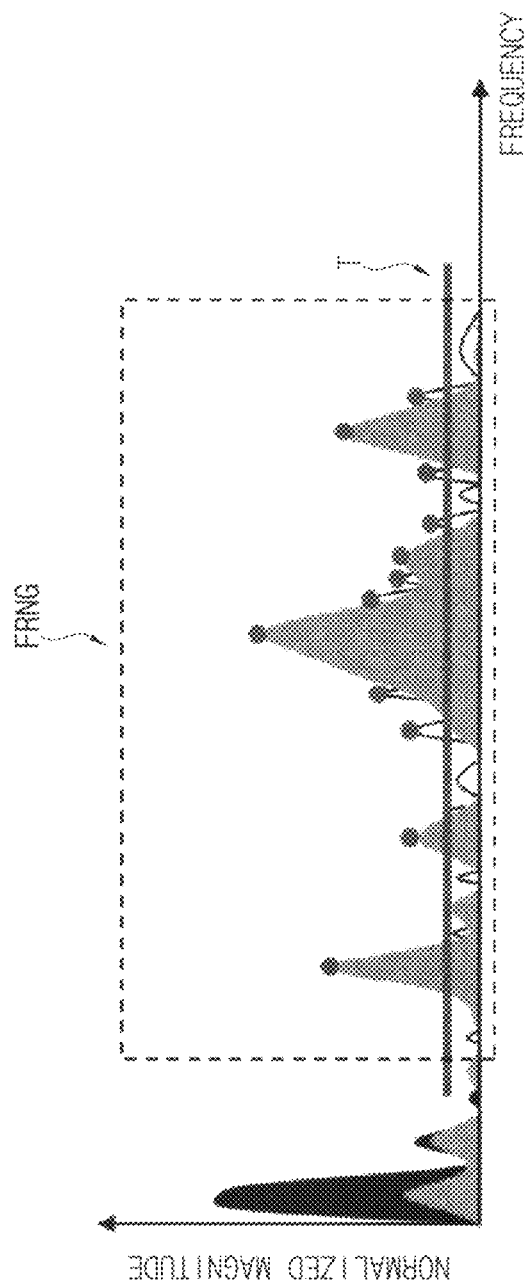

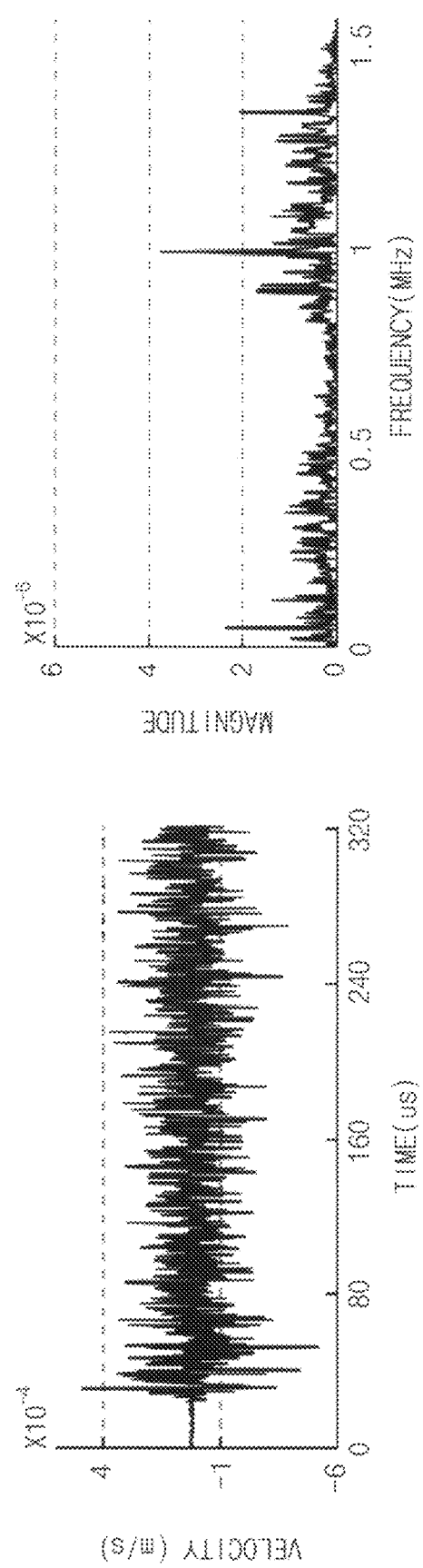

METHOD OF INSPECTING STRUCTURE AND INSPECTION SYSTEM

CROSS-REFERENCE TO RELATED APPLICATION

This application claims priority under 35 USC § 119 to Korean Patent Application No. 10-2018-0076827, filed on Jul. 3, 2018 in the Korean Intellectual Property Office (KIPO), the contents of which are herein incorporated by reference in their entirety.

BACKGROUND

1. Technical Field

Example embodiments relate generally to inspection techniques for structures, and more particularly to methods of inspecting structures and inspection systems performing the methods.

2. Description of the Related Art

An inspection for a structure is performed to check or determine the safety of the structure. If the structure is damaged, the safety of the structure may be degraded or deteriorated. Thus, it is essential to quickly detect the damage of the structure and take appropriate actions for the damaged structure, and researchers are conducting various research projects on techniques of detecting the damage of the structure.

Korean patent No. 10-0784582 is related to an apparatus and a method for measuring a damage of a structure using piezoelectric devices. Particularly, in Korean patent No. 10-0784582, one or more piezoelectric devices are attached to an opposite side of the structure, a stress is applied by a stress applying unit to generate a longitudinal elastic wave, an impedance within a specific frequency range is analyzed by an impedance analyzer, and thus the damage of the structure is easily measured using the piezoelectric devices.

SUMMARY

Some example embodiments provide a method of inspecting a structure capable of efficiently detecting a fatigue crack in a target structure using a nonlinear ultrasonic modulation and a dual laser system.

Some example embodiments provide an inspection system capable of efficiently detecting a fatigue crack in a target structure using a nonlinear ultrasonic modulation and a dual laser system.

According to example embodiments, in a method of inspecting a structure, a first ultrasonic signal generated from a target structure by a first laser beam is received. The first ultrasonic signal is generated by providing the first laser beam generated from a first excitation unit to the target structure. A second ultrasonic signal generated from the target structure by a second laser beam is received. The second ultrasonic signal is generated by providing the second laser beam generated from a second excitation unit to the target structure. The second excitation unit and the second laser beam are different from the first excitation unit and the first laser beam, respectively. A third ultrasonic signal generated from the target structure by the first laser beam and the second laser beam is received. The third ultrasonic signal is generated by simultaneously providing the first laser beam and the second laser beam to the target structure. It is determined whether the target structure is damaged based on a first ultrasonic frequency spectrum, a second ultrasonic frequency spectrum and a third ultrasonic frequency spectrum that are obtained by converting the first ultrasonic signal, the second ultrasonic signal and the third ultrasonic signal, respectively.

In some example embodiments, the first laser beam may have a first size, and the second laser beam may have a second size smaller than the first size.

In some example embodiments, a narrowband input may be generated by the first laser beam, and a wideband input may be generated by the second laser beam.

In some example embodiments, at least one of the first size and the second size may be changeable.

In some example embodiments, when determining whether the target structure is damaged, a frequency range may be selected based on the first ultrasonic frequency spectrum and the second ultrasonic frequency spectrum. A first sideband peak count value within the selected frequency range may be calculated. The first sideband peak count value may indicate a number of first threshold peak points that are greater than or equal to a threshold value among all first peak points included in the second ultrasonic frequency spectrum. A second sideband peak count value within the selected frequency range may be calculated. The second sideband peak count value may indicate a number of second threshold peak points that are greater than or equal to the threshold value among all second peak points included in the third ultrasonic frequency spectrum. It may be determined whether a fatigue crack is included in the target structure by comparing the first sideband peak count value with the second sideband peak count value.

In some example embodiments, it may be determined that the fatigue crack is included in the target structure when a sideband peak count difference value obtained by subtracting the first sideband peak count value from the second sideband peak count value is a positive value.

In some example embodiments, a degree of damage of the target structure may increase as the sideband peak count difference value increases.

In some example embodiments, the threshold value may be changeable.

According to example embodiments, an inspection system includes a first excitation unit, a second excitation unit, a sensing unit and a control unit. The first excitation unit generates a first laser beam. The second excitation unit generates a second laser beam. The second excitation unit and the second laser beam are different from the first excitation unit and the first laser beam, respectively. The sensing unit receives a first ultrasonic signal generated from a target structure by the first laser beam, receives a second ultrasonic signal generated from the target structure by the second laser beam, and receives a third ultrasonic signal generated from the target structure by the first laser beam and the second laser beam. The first ultrasonic signal is generated by providing the first laser beam to the target structure. The second ultrasonic signal is generated by providing the second laser beam to the target structure. The third ultrasonic signal is generated by simultaneously providing the first laser beam and the second laser beam to the target structure. The control unit determines whether the target structure is damaged based on a first ultrasonic frequency spectrum, a second ultrasonic frequency spectrum and a third ultrasonic frequency spectrum that are obtained by converting the first ultrasonic signal, the second ultrasonic signal and the third ultrasonic signal, respectively.

In some example embodiments, the first laser beam may have a first size, and the second laser beam may have a second size smaller than the first size.

In some example embodiments, a narrowband input may be generated by the first laser beam, and a wideband input may be generated by the second laser beam.

In some example embodiments, at least one of the first size and the second size may be changeable by the control unit.

In some example embodiments, the control unit may select a frequency range based on the first ultrasonic frequency spectrum and the second ultrasonic frequency spectrum, may calculate a first sideband peak count value within the selected frequency range, may calculate a second sideband peak count value within the selected frequency range, and may determine whether a fatigue crack is included in the target structure by comparing the first sideband peak count value with the second sideband peak count value. The first sideband peak count value may indicate a number of first threshold peak points that are greater than or equal to a threshold value among all first peak points included in the second ultrasonic frequency spectrum. The second sideband peak count value may indicate a number of second threshold peak points that are greater than or equal to the threshold value among all second peak points included in the third ultrasonic frequency spectrum.

In some example embodiments, the control unit may determine that the fatigue crack is included in the target structure when a sideband peak count difference value obtained by subtracting the first sideband peak count value from the second sideband peak count value is a positive value.

In some example embodiments, a degree of damage of the target structure may increase as the sideband peak count difference value increases.

In some example embodiments, the threshold value may be changeable by the control unit.

Accordingly, in the method of inspecting the structure and the inspection system according to example embodiments, two different excitation units may be used to generate two different laser beams to obtain the NB response and the WB response and to obtain the WB+NB response, and thus the data collection time may be reduced. In addition, it may be efficiently inspected or diagnosed the damage or the damage characteristic of the target structure without the reference structure.

BRIEF DESCRIPTION OF THE DRAWINGS

FIG. 4 is a flowchart illustrating a method of inspecting a structure according to example embodiments.

FIGS. 6A, 6B, 7A and 7B are diagrams for describing an operation of determining whether the target structure is damaged in FIG. 5.

FIGS. 8, 9, 10A, 10B, 10C, 11A, 11B, 11C, 12, 13A, 13B and 14 are diagrams for describing experimental results based on a method of inspecting a structure according to example embodiments.

DETAILED DESCRIPTION OF THE EMBODIMENTS

Figure 1:
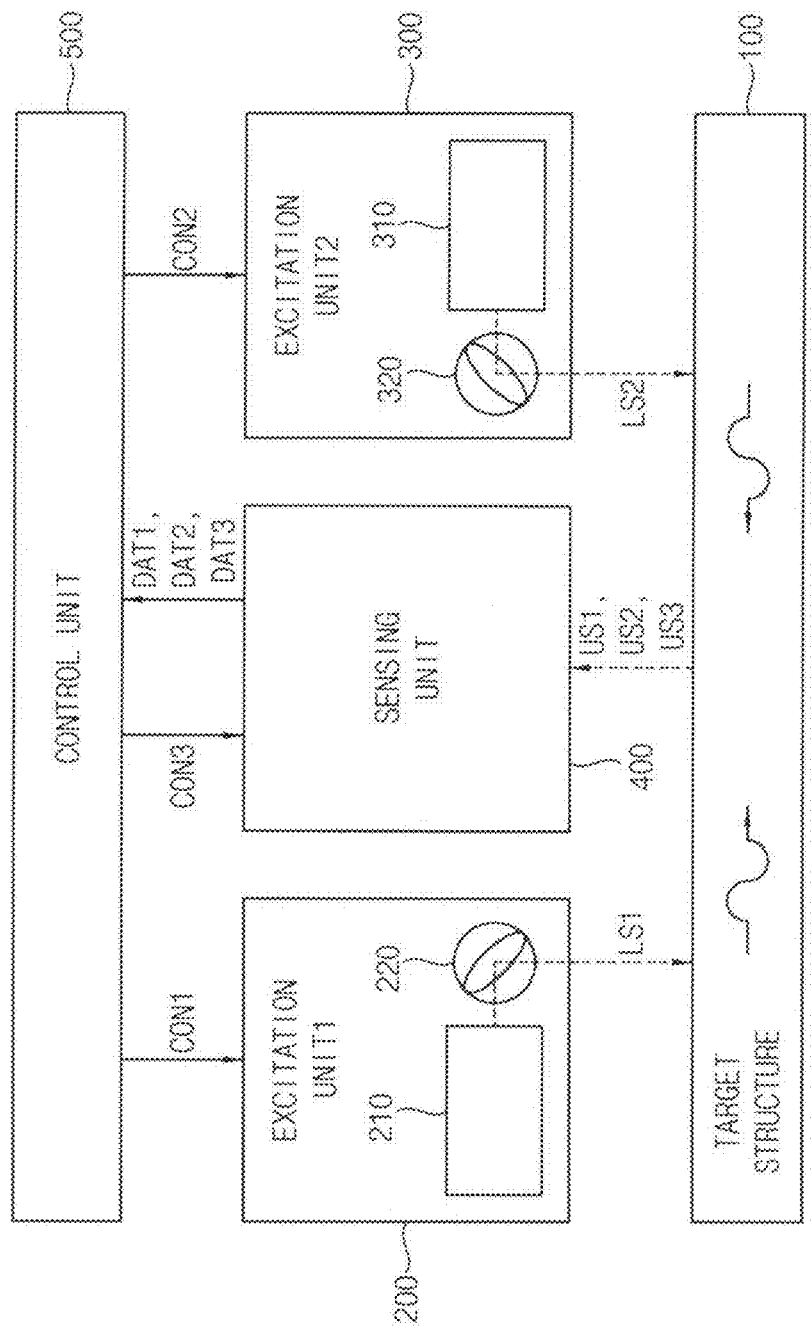
FIG. 1 is a block diagram illustrating an inspection system according to example embodiments.

Various example embodiments will be described more fully with reference to the accompanying drawings, in which embodiments are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The above and other features of the inventive concept will become more apparent by describing in detail example embodiments thereof with reference to the accompanying drawings. The same reference numerals are used for the same elements in the drawings and redundant explanations for the same elements are omitted.

Figure 2:
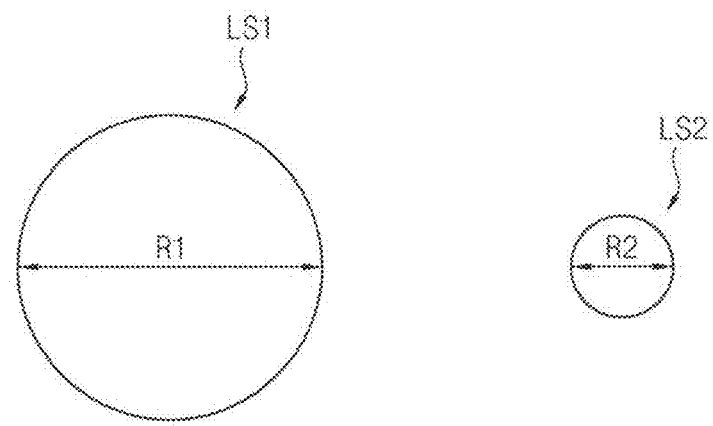
FIG. 2 is a diagram illustrating an example of first and second laser beams provided to a target structure in an inspection system according to example embodiments.
Figure 3A:
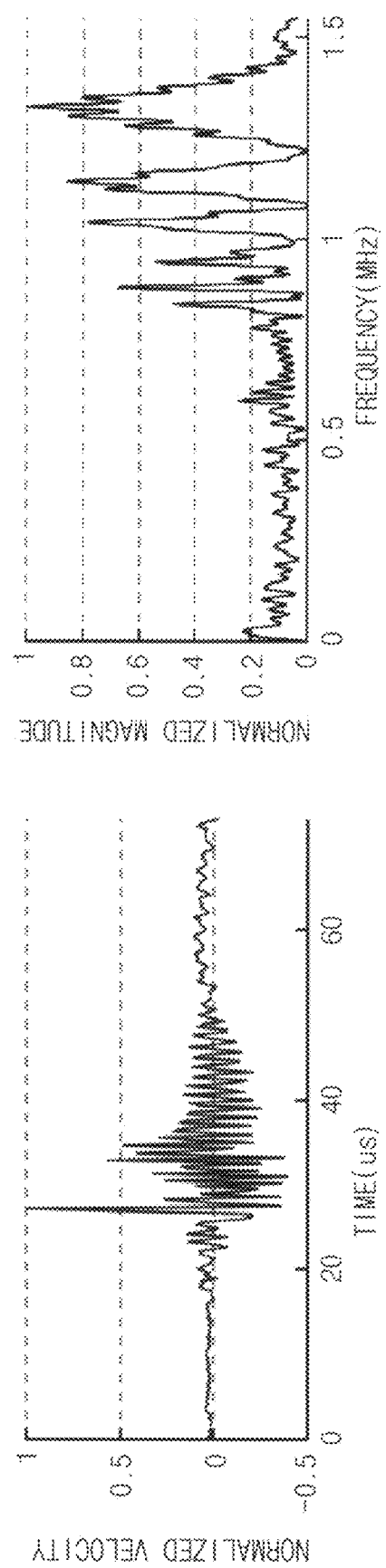
FIGS. 3A, 3B, 3C, 3D, 3E and 3F are graphs illustrating response characteristics according to sizes of laser beams.
Figure 3B:
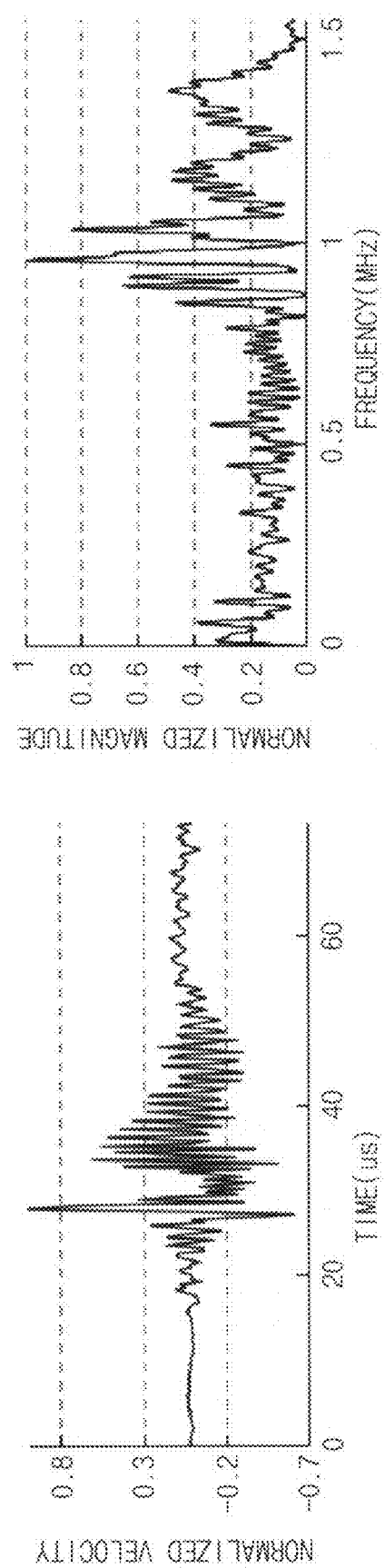
Figure 3C:
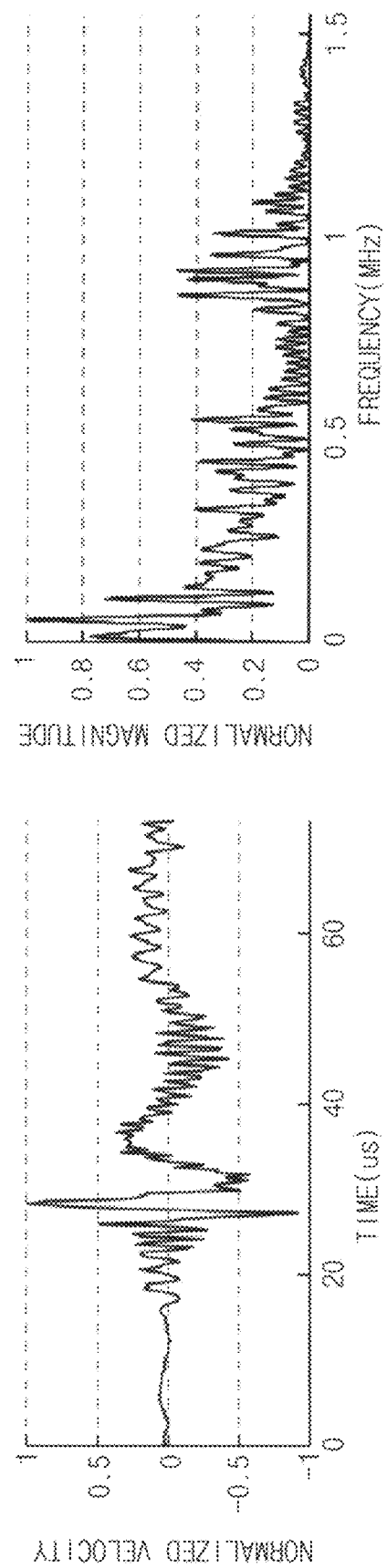
Figure 3D:
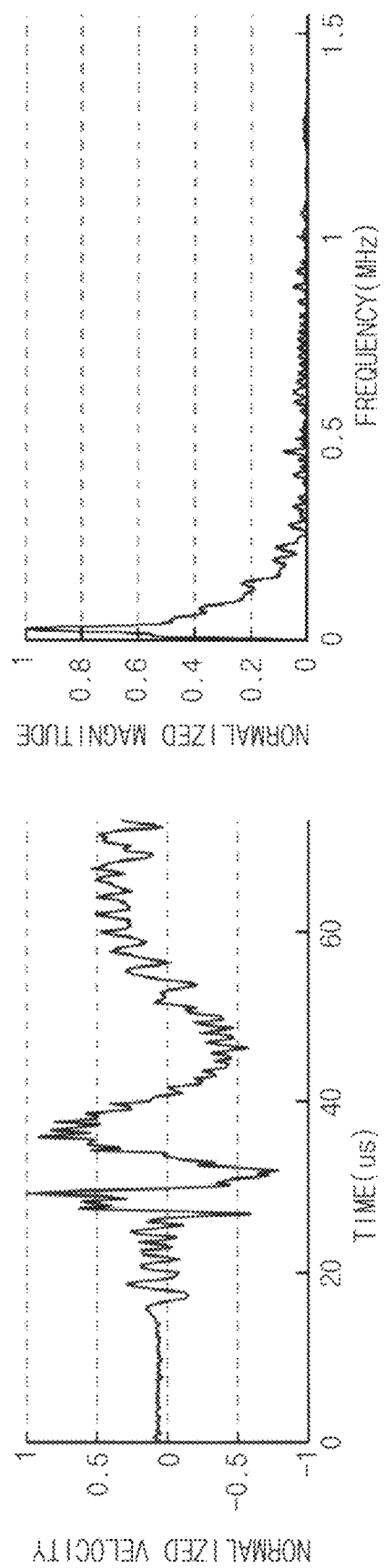
Figure 3E:
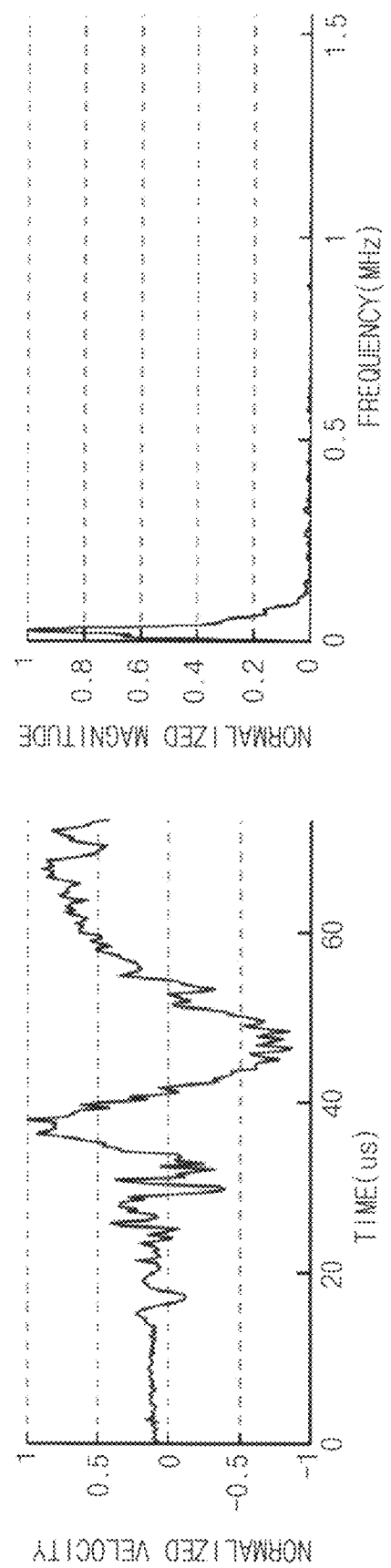
Figure 3F:
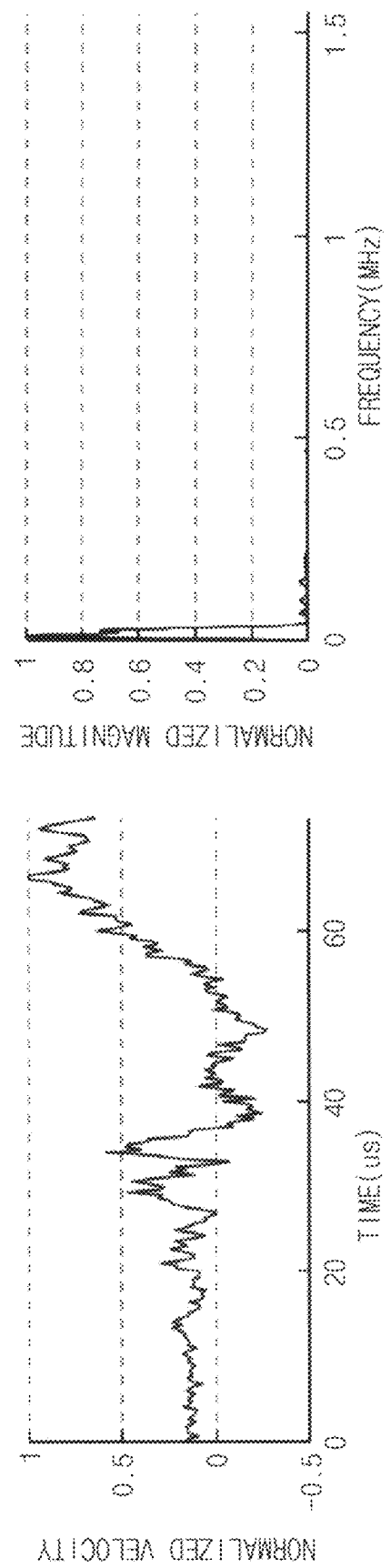

FIG. 1 is a block diagram illustrating an inspection system according to example embodiments. FIG. 2 is a diagram illustrating an example of first and second laser beams provided to a target structure in an inspection system according to example embodiments. FIGS. 3A, 3B, 3C, 3D, 3E and 3F are graphs illustrating response characteristics according to sizes of laser beams.

Referring to FIGS. 1, 2, 3A, 3B, 3C, 3D, 3E and 3F, an inspection system 10 includes a first excitation unit 200, a second excitation unit 300, a sensing unit 400 and a control unit 500.

The first excitation unit 200 generates a first laser beam LS1. The first excitation unit 200 may include a first pulse laser generator 210 and a first rotating mirror 220. The first laser beam LS1 generated from the first pulse laser generator 210 may be provided to a target structure (or a target specimen) 100 via the first rotating mirror 220. The first excitation unit 200 may be referred to as a first laser generation unit.

The second excitation unit 300 generates a second laser beam LS2 that is different from the first laser beam LS1. The second excitation unit 300 is implemented to be different from (e.g., distinguished or separated from) the first excitation unit 200. The second excitation unit 300 may include a second pulse laser generator 310 and a second rotating mirror 320. The second laser beam LS2 generated from the second pulse laser generator 310 may be provided to the target structure 100 via the second rotating mirror 320. The second excitation unit 300 may be referred to as a second laser generation unit.

In some example embodiments, the first laser beam LS1 and the second laser beam LS2 may have different sizes. For example, the first laser beam LS1 may have a first size, and the second laser beam LS2 may have a second size that is smaller than the first size. As illustrated in FIG. 2, when the first and second laser beams LS1, LS2 are provided in a circular shape on a plane (e.g., in a plan view), the first size of the first laser beam LS1 may be represented by a first diameter R1 (or a first radius), and the second size of the second laser beam LS2 may be represented by a second diameter R2 (or a second radius) that is shorter than the first diameter R1. Although FIG. 2 illustrates the laser beams LS1 and LS2 in a circular shape on a plane, example embodiments are not limited thereto.

In some example embodiments, a narrowband (NB) input may be generated by the first laser beam LS1, and a wideband (WB) input may be generated by the second laser beam LS2. For example, FIGS. 3A, 3B, 3C, 3D, 3E and 3F illustrate a normalized velocity in a time domain and a normalized magnitude in a frequency domain when a radius of the laser beam is about 0.5 mm, 1 mm, 2 mm, 4 mm, 8 mm and 16 mm, respectively. As illustrated in FIGS. 3A, 3B, 3C, 3D, 3E and 3F, a response frequency in the frequency domain may become lower and a width associated with the response frequency may become narrower as a size of the laser beam increases. Thus, it may be checked that the narrowband input is generated by the first laser beam LS1 having a relatively large size.

A first ultrasonic signal (or ultrasound signal) US1, a second ultrasonic signal US2 and a third ultrasonic signal US3 are generated from the target structure 100 by the first laser beam LS1 and the second laser beam LS2. For example, when the first laser beam LS1 is provided to the target structure 100, the target structure 100 may generate the first ultrasonic signal US1 by thermal expansion. Similarly, when the second laser beam LS2 is provided to the target structure 100, the target structure 100 may generate the second ultrasonic signal US2 by thermal expansion. When the first laser beam LS1 and the second laser beam LS2 are substantially simultaneously or concurrently pro-vided to the target structure 100, the target structure 100 may generate the third ultrasonic signal US3 by thermal expansion.

The sensing unit 400 receives the first ultrasonic signal US1, the second ultrasonic signal US2 and the third ultrasonic signal US3 that are generated from the target structure 100. For example, the first, second and third ultrasonic signals US1, US2 and US3 may be generated at different time points, and the sensing unit 400 may sequentially receive the first, second and third ultrasonic signals US1, US2 and US3.

The control unit 500 receives first data DAT1, second data DAT2 and third data DAT3 that correspond to the first ultrasonic signal US1, the second ultrasonic signal US2 and the third ultrasonic signal US3, respectively, from the sensing unit 400. The control unit 500 determines whether the target structure 100 is damaged based on the first, second and third ultrasonic signals US1, US2 and US3 (e.g., based on the first, second and third data DAT1, DAT2 and DAT3). For example, the control unit 500 may determine whether the target structure 100 is an intact (or undamaged) structure or a damaged structure.

The control unit 500 may generate a first control signal CON1, a second control signal CON2 and a third control signal CON3 for controlling the first excitation unit 200, the second excitation unit 300 and the sensing unit 400, respectively. The first excitation unit 200, the second excitation unit 300 and the sensing unit 400 may be synchronized to perform the above described operations under a control of the control unit 500.

In some example embodiments, at least one of the first size of the first laser beam LS1 and the second size of the second laser beam LS2 may be changed or changeable by the control unit 500. For example, the control unit 500 may change at least one of the first size and the second size based on the first and second control signals CON1 and CON2.

FIG. 4 is a flowchart illustrating a method of inspecting a structure according to example embodiments.

Referring to FIGS. 1 and 4, in a method of inspecting a structure according to example embodiments, the first ultrasonic signal US1 generated from the target structure 100 by the first laser beam LS1 is received (step S100). The first ultrasonic signal US1 is generated by providing the first laser beam LS1 to the target structure 100. Step S100 may be performed by the first excitation unit 200 and the sensing unit 400.

The second ultrasonic signal US2 generated from the target structure 100 by the second laser beam LS2 is received (step S200). The second ultrasonic signal US2 is generated by providing the second laser beam LS2 that is different from the first laser beam LS1 to the target structure 100. Step S200 may be performed by the second excitation unit 300 that is different from the first excitation unit 200 and the sensing unit 400.

The third ultrasonic signal US3 generated from the target structure 100 by the first laser beam LS1 and the second laser beam LS2 is received (step S300). The third ultrasonic signal US3 is generated by simultaneously providing the first laser beam LS1 and the second laser beam LS2 to the target structure 100. Step S300 may be performed by the first excitation unit 200, the second excitation unit 300 and the sensing unit 400.

In the method of inspecting the structure according to example embodiments, two different laser beams LS1 and LS2 provided to the target structure 100 may be generated from two different excitation units 200 and 300, respectively. Specifically, the excitation units 200 and 300 should be separately implemented and/or distinguished from each other such that two different laser beams LS1 and LS2 are able to be simultaneously provided to the target structure 100, as described in step S300. However, although not illustrated, one laser beam may be split into two laser beams LS1 and LS2.

In some example embodiments, generation times of the first, second and third ultrasonic signals US1, US2 and US3 may be different from each other. For example, the first ultrasonic signal US1 may be generated by the first laser beam LS1 at a first time point, the second ultrasonic signal US2 may be generated by the second laser beam LS2 at a second time point after the first time point, and the third ultrasonic signal US3 may be generated by the first and second laser beams LS1 and LS2 at a third time point after the second time point. An order of generation of the first, second, and third ultrasonic signals US1, US2 and US3 may be changed according to example embodiments.

It is determined whether the target structure 100 is damaged based on a first ultrasonic frequency spectrum (or ultrasound frequency spectrum), a second ultrasonic frequency spectrum and a third ultrasonic frequency spectrum that are obtained by converting the first ultrasonic signal US1, the second ultrasonic signal US2 and the third ultrasonic signal US3, respectively (step S400). Step S400 may be performed by the control unit 500.

In some example embodiments, the first, second and third ultrasonic frequency spectra may be obtained by the control unit 500. In other example embodiments, the first, second and third ultrasonic frequency spectra may be obtained by the sensing unit 400 and may be provided to the control unit 500 in a form of the first, second and third data DAT1, DAT2 and DAT3.

Figure 5:
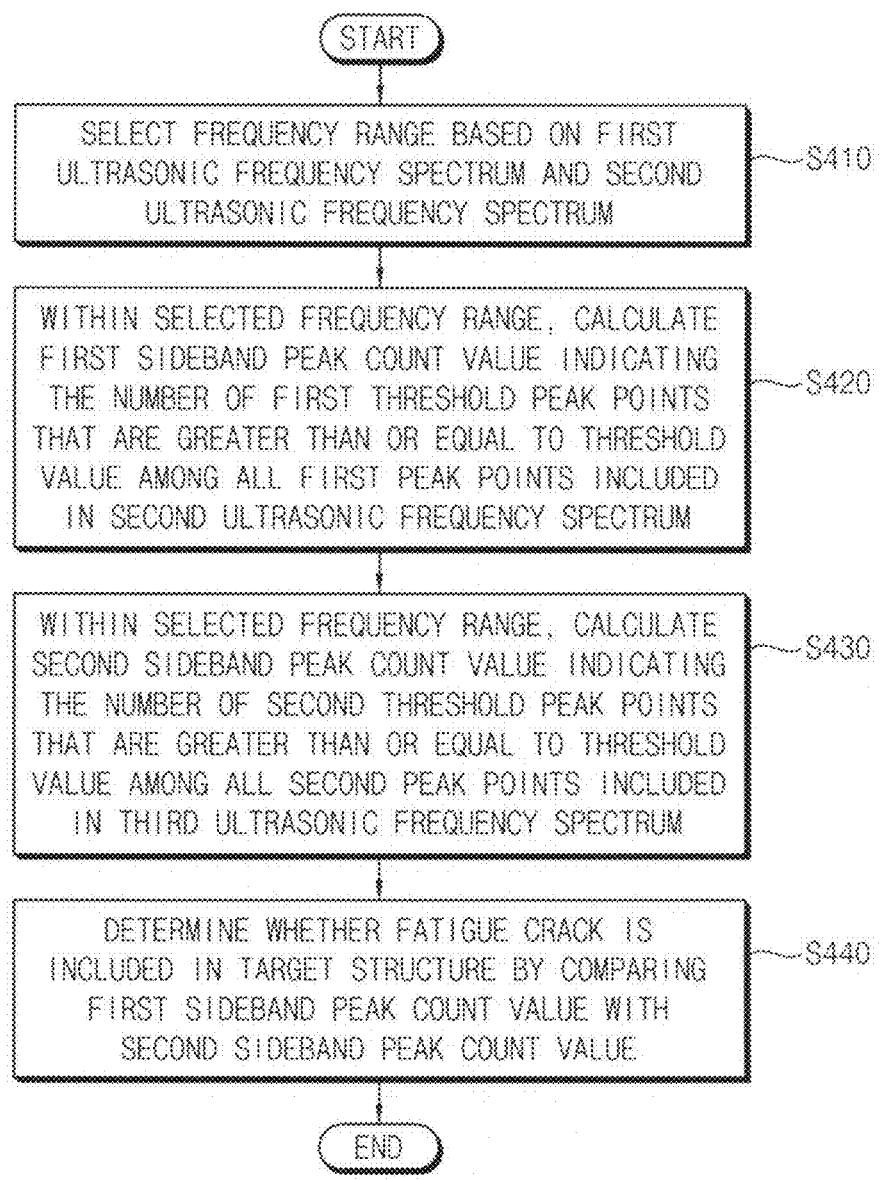
FIG. 5 is a flowchart illustrating an example of determining whether a target structure is damaged included in a method of inspecting a structure according to example embodiments.

FIG. 5 is a flowchart illustrating an example of determining whether a target structure is damaged included in a method of inspecting a structure according to example embodiments. FIGS. 6A, 6B, 7A and 7B are diagrams for describing an operation of determining whether the target structure is damaged in FIG. 5.

Referring to FIGS. 1, 4, 5, 6A, 6B, 7A and 7B, when determining whether the target structure is damaged (step S400), a frequency range may be selected based on the first ultrasonic frequency spectrum that is obtained by converting the first ultrasonic signal US1 and the second ultrasonic frequency spectrum that is obtained by converting the second ultrasonic signal US2 (step S410).

Figure 6B:
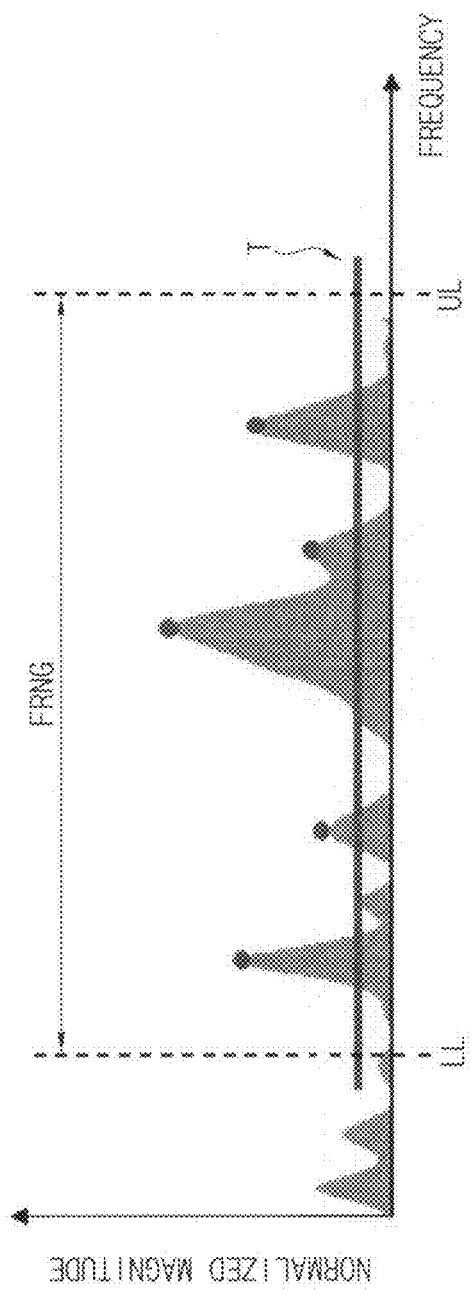

For example, the Fourier transform may be performed on the first ultrasonic signal US1 that is a signal in a time domain, and thus a first ultrasonic frequency spectrum illustrated in FIG. 6A may be obtained. As described with reference to FIGS. 2, 3A, 3B, 3C, 3D, 3E and 3F, since the first laser beam LS1 has a relatively large size, the first ultrasonic frequency spectrum that is obtained by converting the first ultrasonic signal US1 generated by the first laser beam LS1 may be formed in a relatively narrow band at a low frequency, and thus a lower limit of the frequency range (e.g., a lower limit LL of a frequency range FRNG in FIG. 6B) may be set based on the first ultrasonic frequency spectrum (e.g., a narrowband response or NB response).

In addition, the Fourier transform may be performed on the second ultrasonic signal US2 that is a signal in a time domain, and thus a second ultrasonic frequency spectrum illustrated in FIG. 6B may be obtained. Since the second laser beam LS2 has a relatively small size, the second ultrasonic frequency spectrum that is obtained by converting the second ultrasonic signal US2 generated by the second laser beam LS2 may be formed in a relatively wide band, and thus an upper limit of the frequency range (e.g., an upper limit UL of the frequency range FRNG in FIG. 6B) may be set based on the second ultrasonic frequency spectrum (e.g., a wideband response or WB response). The frequency range FRNG may be selected based on the lower limit LL and the upper limit UL.

Further, as will be described with reference to FIGS. 7A and 7B, the Fourier transform may be performed on the third ultrasonic signal US3 that is a signal in a time domain, and thus a third ultrasonic frequency spectrum may be obtained.

A first sideband peak count (SPC) value within the selected frequency range may be calculated (step S420). The first sideband peak count value may indicate the number of first threshold peak points that are greater than or equal to a threshold value among all first peak points included in the second ultrasonic frequency spectrum.

For example, a threshold value T may be set, as illustrated in FIG. 6B. For example, the threshold value T may be greater than or equal to zero and less than or equal to one. Within the selected frequency range FRNG, the first sideband peak count value that indicates the number of the first threshold peak points that are greater than or equal to the threshold value T among all the first peak points included in the second ultrasonic frequency spectrum may be calculated. For example, the first sideband peak count value may satisfy Equation 1.

$$SPC_{WB}(T) = \frac{NP_{WB}(T)}{NT_{WB}} \quad \text{[Equation 1]}$$

In Equation 1, $SPC_{WB}(T)$ represents the first sideband peak count value for the threshold value T, $NT_{WB}$ represents the number of all the first peak points included in the second ultrasonic frequency spectrum within the selected frequency range FRNG, and $NP_{WB}(T)$ represents the number of the first threshold peak points included in the second ultrasonic frequency spectrum with respect to the threshold value T within the selected frequency range FRNG. The second ultrasonic frequency spectrum may be used as a reference for determining whether the target structure 100 is damaged.

In some example embodiments, the threshold value T may be changed or changeable by the control unit 500.

A second sideband peak count value within the selected frequency range may be calculated (step S430). The second sideband peak count value may indicate the number of second threshold peak points that are greater than or equal to the threshold value among all second peak points included in the third ultrasonic frequency spectrum.

For example, as with the first sideband peak count value, the second sideband peak count value may satisfy Equation 2.

$$SPC_{WB+NB}(T) = \frac{NP_{WB+NB}(T)}{NT_{WB+NB}} \quad \text{[Equation 2]}$$

In Equation 2, $SPC_{WB+NB}(T)$ represents the second sideband peak count value for the threshold value T, $NT_{WB+NB}$ represents the number of all the second peak points included in the third ultrasonic frequency spectrum (e.g., a WB+NB response) within the selected frequency range FRNG, and $NP_{WB+NB}(T)$ represents the number of the second threshold peak points included in the third ultrasonic frequency spectrum with respect to the threshold value T within the selected frequency range FRNG.

It may be determined whether a fatigue crack is included in the target structure 100 by comparing the first sideband peak count value with the second sideband peak count value (step S440). For example, a sideband peak count difference (SPCD) value that is obtained by subtracting the first sideband peak count value from the second sideband peak count value may satisfy Equation 3.

$$SPCD(T)=SPC_{WB+NB}(T)-SPC_{WB}(T) \quad [\text{Equation 3}]$$

In Equation 3, SPCD(T) represents the sideband peak count difference value for the threshold value T. It may be determined whether there is the fatigue crack in the target structure 100 based on the difference of the sideband peak count difference value.

For example, FIG. 7A illustrates an example of the third ultrasonic frequency spectrum obtained when the fatigue crack is not included in the target structure 100 (e.g., when the target structure 100 is an intact or undamaged structure). In this case, the third ultrasonic frequency spectrum that is obtained by converting the third ultrasonic signal US3 generated by the first and second laser beams LS1 and LS2 may be substantially the same as the sum of the first and second ultrasonic frequency spectra. In an example of FIGS. 6B and 7A, the number of all the first peak points included in the second ultrasonic frequency spectrum within the selected frequency range FRNG may be substantially equal to the number of all the second peak points included in the third ultrasonic frequency spectrum within the selected frequency range FRNG (e.g., $NT_{WB}=NT_{WB+NB}$), the number of the first threshold peak points included in the second ultrasonic frequency spectrum with respect to the threshold value T within the selected frequency range FRNG and the number of the second threshold peak points included in the third ultrasonic frequency spectrum with respect to the threshold value T within the selected frequency range FRNG may be five (e.g., $NP_{WB}(T)=NP_{WB+NB}(T)=5$), and thus the sideband peak count difference value may be zero.

For another example, FIG. 7B illustrates an example of the third ultrasonic frequency spectrum obtained when the fatigue crack is included in the target structure 100 (e.g., when the target structure 100 is a damaged structure). In this case, the third ultrasonic frequency spectrum that is obtained by converting the third ultrasonic signal US3 generated by the first and second laser beams LS1 and LS2 may be different from the sum of the first and second ultrasonic frequency spectra. For example, a nonlinear modulation may occur between the wideband response and the narrowband response, and thus more sideband peaks or increased sideband energy may exist within the selected frequency band. In an example of FIGS. 6B and 7B, the number of the first threshold peak points included in the second ultrasonic frequency spectrum with respect to the threshold value T within the selected frequency range FRNG may be five (e.g., $NP_{WB}(T)=5$), the number of the second threshold peak points included in the third ultrasonic frequency spectrum with respect to the threshold value T within the selected frequency range FRNG may be twelve (e.g., $NP_{WB+NB}(T)=12$), and thus the sideband peak count difference value may be a positive value.

In other words, it may be determined that the fatigue crack is included in the target structure 100 when the sideband peak count difference value obtained by subtracting the first sideband peak count value from the second sideband peak count value is a positive value.

In some example embodiments, a degree of damage of the target structure 100 may increase as the sideband peak count difference value increases.

In some example embodiments, a maximum sideband peak count difference (MSPCD) value may satisfy Equation 3.

$$MSPCD=|\max(SPCD(T))| \quad [\text{Equation 4}]$$

Since the energy of the crack induced the nonlinear modulation (e.g., sideband) is much smaller than that of the linear responses, the maximum sideband peak count difference value may often occur at a relatively small threshold value T.

In the method of inspecting the structure according to example embodiments, two different excitation units 200 and 300 (e.g., a dual laser system) may be used to generate two different laser beams LS1 and LS2 to obtain the NB response and the WB response and to obtain the WB+NB response. Thus, the broadband nature of the pulse laser inputs may increase the possibility of satisfying the binding conditions for the nonlinear modulation generation, and may reduce the data collection time as compared with sweeping of two single input frequencies for the same frequency band. Further, compared with a system including a single excitation unit or using a single laser beam, the inspection system according to example embodiments (e.g., a dual laser ultrasonic inspection system) may allow damage features to be extracted without relying on any baseline data obtained from the pristine condition of the target structure. In other words, it may be efficiently inspected or diagnosed the damage or the damage characteristic of the target structure without the reference structure.

FIGS. 8, 9, 10A, 10B, 10C, 11A, 11B, 11C, 12, 13A, 13B and 14 are diagrams for describing experimental results based on a method of inspecting a structure according to example embodiments.

Figure 8:
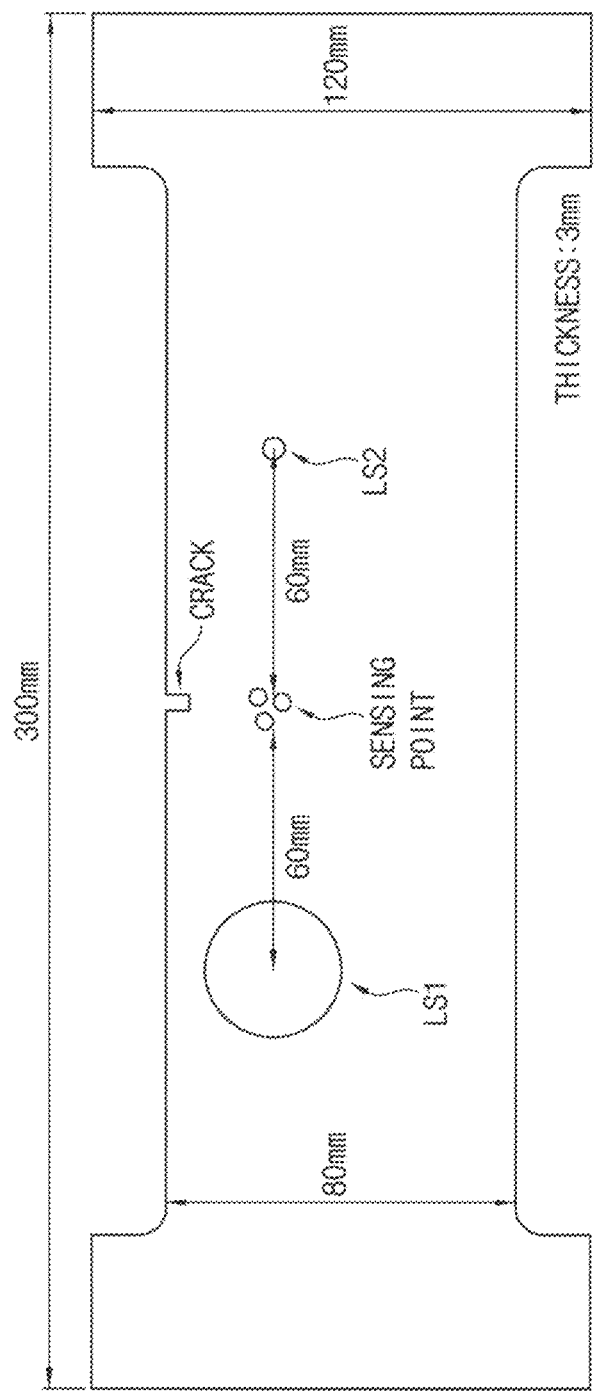
Figure 9:
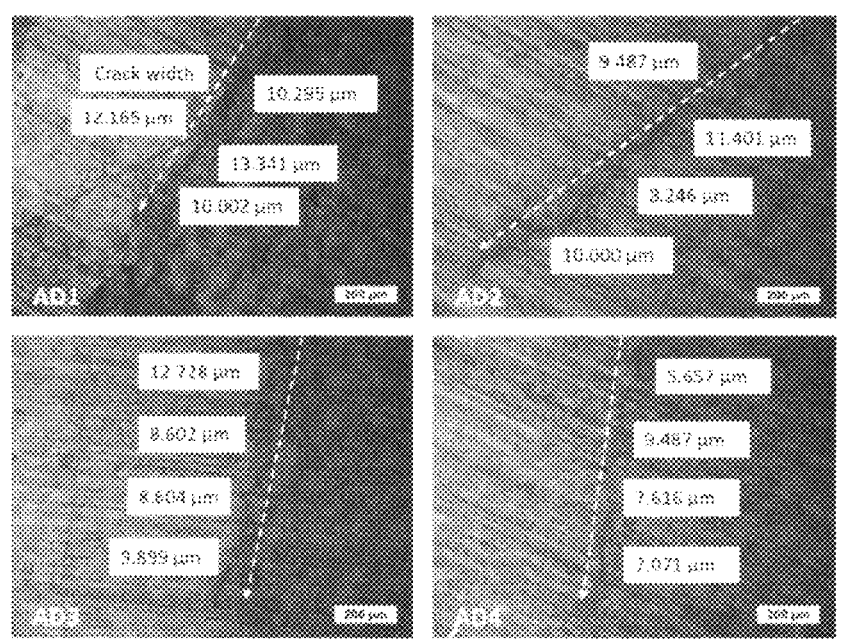

Referring to FIGS. 8 and 9, six 3 mm thick I-shaped aluminum plate specimens made of aluminum alloy were prepared to evaluate the performance of example embodiments. Four aluminum plates with cracks in the middle were prepared and named as a first damaged specimen AD1, a second damaged specimen AD2, a third damaged specimen AD3 and a fourth damaged specimen AD4. As illustrated in FIG. 8, a notch was introduced in the middle of one edge of each damaged specimen, and a fatigue crack was initiated from this notch. All geometrical information of the damaged specimen are illustrated in FIG. 8. FIG. 9 is a microscope image showing cracks of the first to fourth damaged specimens AD1, AD2, AD3 and AD4. Although not illustrated in FIGS. 8 and 9, two aluminum plates without cracks were prepared and named as a first intact specimen AI1 and a second intact specimen AI2.

In addition, positions about 60 mm away from a sensing point to the left and right sides were set as irradiation positions of the first laser beam LS1 and the second laser beam LS2, respectively. The first excitation unit 200 for generating the first laser beam LS1 was used to excite a NB input with a pulse energy of around 20 mJ and a beam radius of about 10 mm. The second excitation unit 300 for generating the second laser beam LS2 was used to excite a NB input with a pulse energy of around 15 mJ and a beam radius of about 1 mm.

Figure 10A:
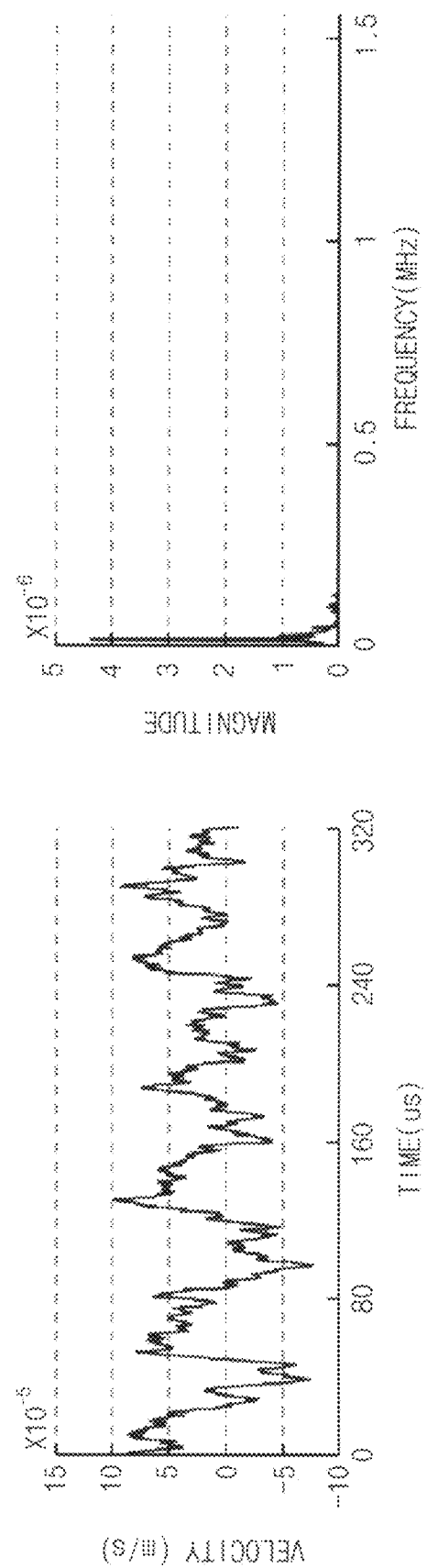
Figure 10C:
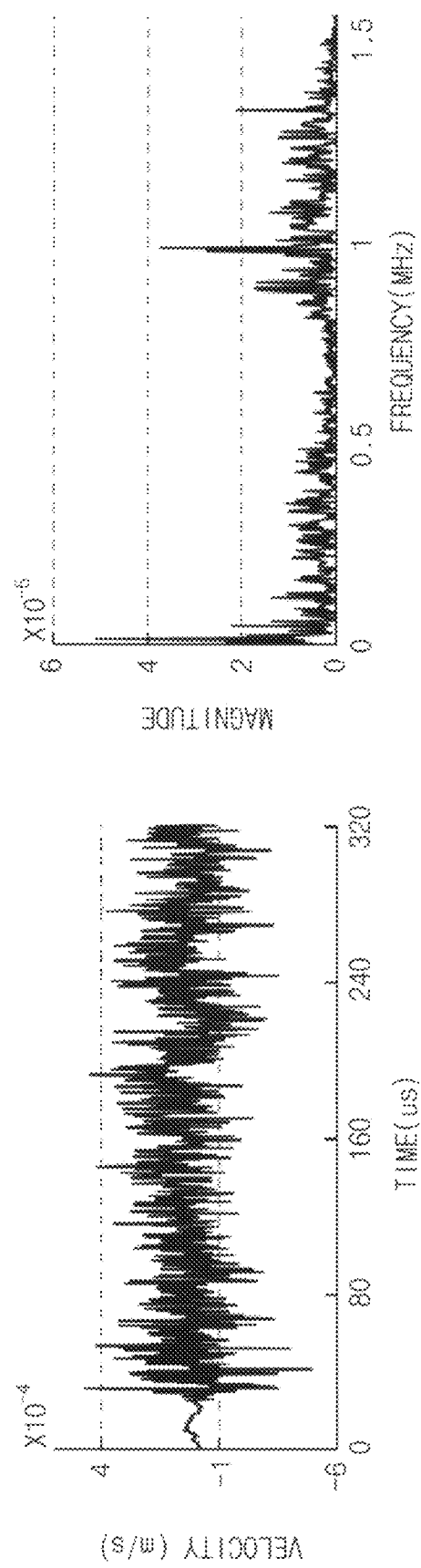

Referring to FIGS. 10A, 10B and 10C, the method of inspecting the structure according to example embodiments was performed on the first intact specimen AI1, and thus a NB response, a WB response and a WB+NB response were obtained. FIG. 10A illustrates a first ultrasonic frequency spectrum (e.g., the NB response) obtained by converting the first ultrasonic signal US1 generated by the first laser beam LS1. FIG. 10B illustrates a second ultrasonic frequency spectrum (e.g., the WB response) obtained by converting the second ultrasonic signal US2 generated by the second laser beam LS2. FIG. 10C illustrates a third ultrasonic frequency spectrum (e.g., the WB+NB response) obtained by converting the third ultrasonic signal US3 generated by the first and second laser beams LS1 and LS2.

Figure 11A:
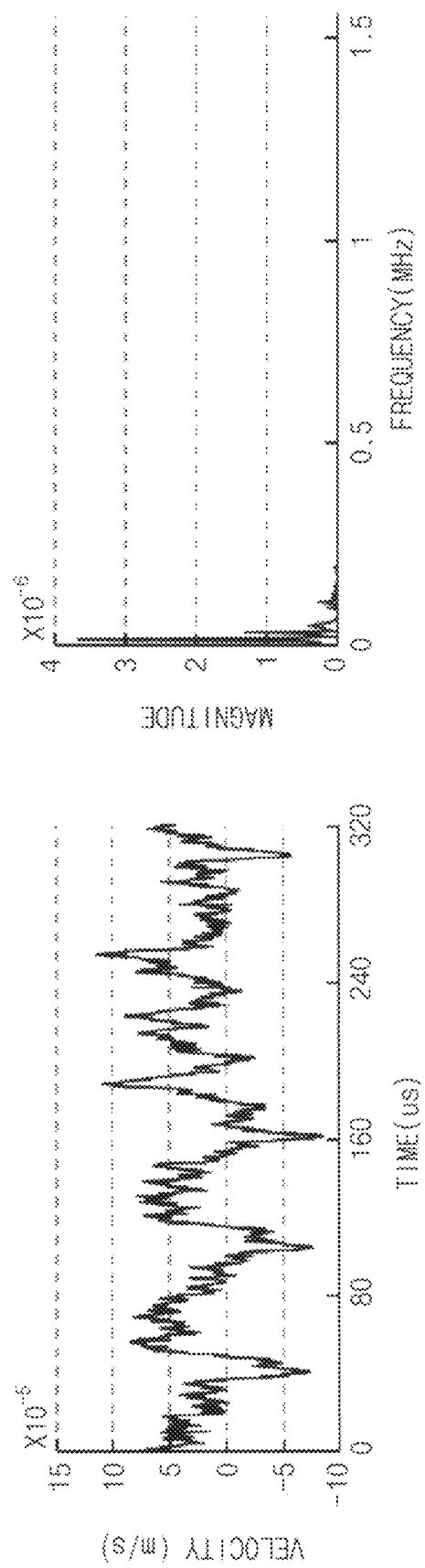
Figure 11B:
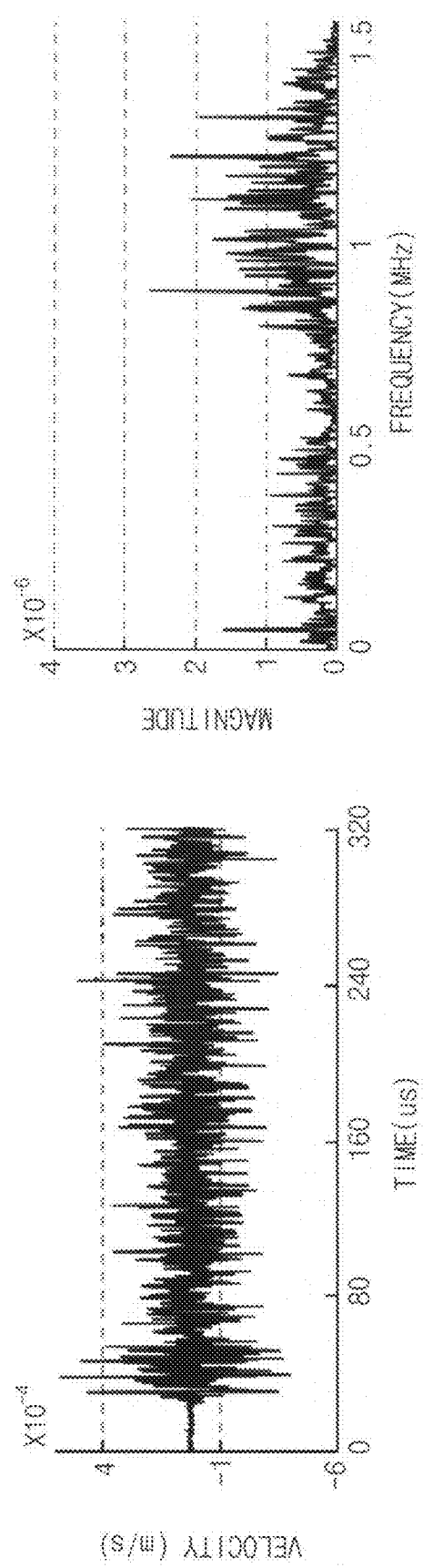
Figure 11C:
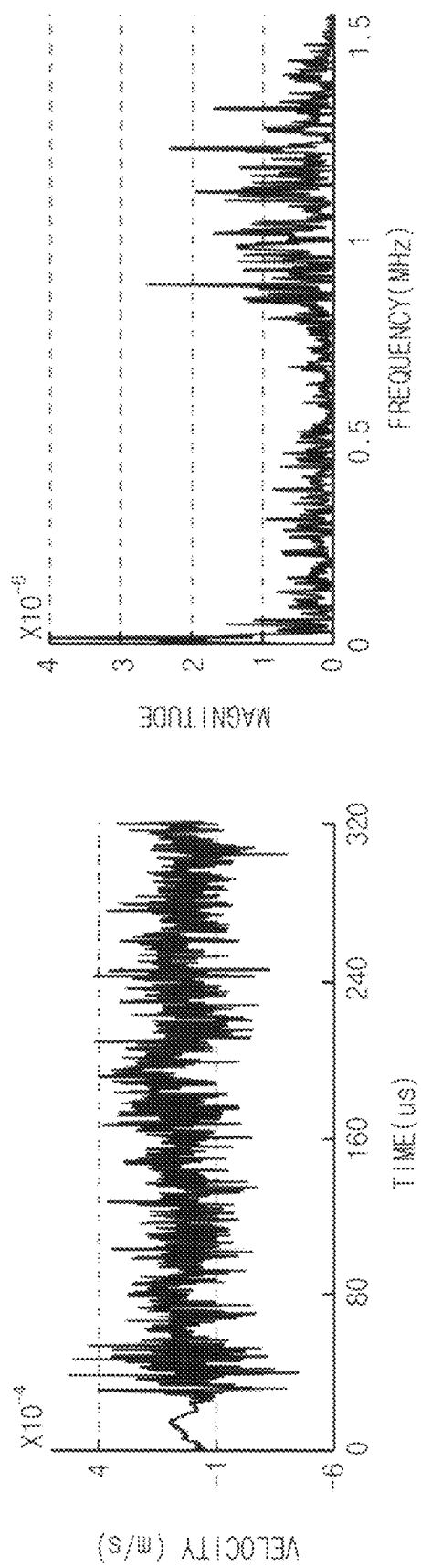

Referring to FIGS. 11A, 11B and 11C, the method of inspecting the structure according to example embodiments was performed on the first damaged specimen AD1, and thus a NB response, a WB response and a WB+NB response were obtained. FIG. 11A illustrates a first ultrasonic frequency spectrum (e.g., the NB response) obtained by converting the first ultrasonic signal US1 generated by the first laser beam LS1. FIG. 11B illustrates a second ultrasonic frequency spectrum (e.g., the WB response) obtained by converting the second ultrasonic signal US2 generated by the second laser beam LS2. FIG. 11C illustrates a third ultrasonic frequency spectrum (e.g., the WB+NB response) obtained by converting the third ultrasonic signal US3 generated by the first and second laser beams LS1 and LS2.

Although not illustrated in FIGS. 10A, 10B, 10C, 11A, 11B and 11C, a NB response, a WB response and a WB+NB response were obtained for each of the second intact specimen AI2 and the second to fourth damaged specimens AD2, AD3 and AD4.

Figure 12:
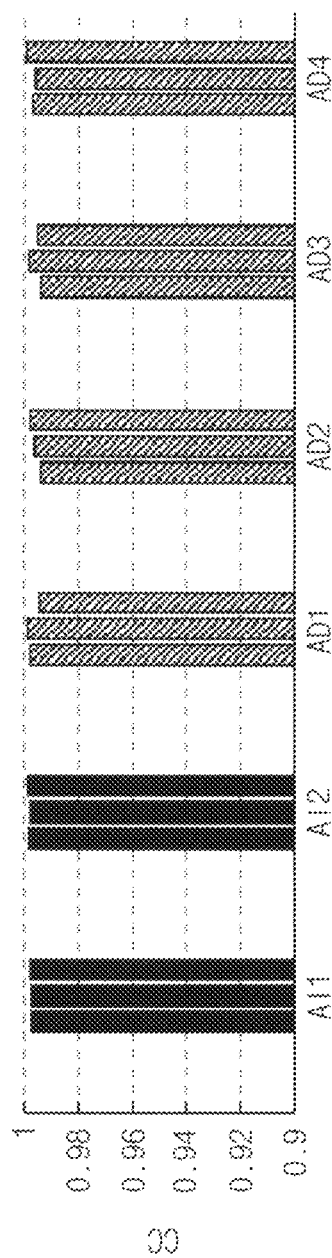

Referring to FIG. 12, the correlation coefficients (CC) between the WB response and the WB+NB response are illustrated in each of the intact specimens AI1 and AI2 and the damaged specimens AD1, AD2, AD3 and AD4.

Figure 13A:
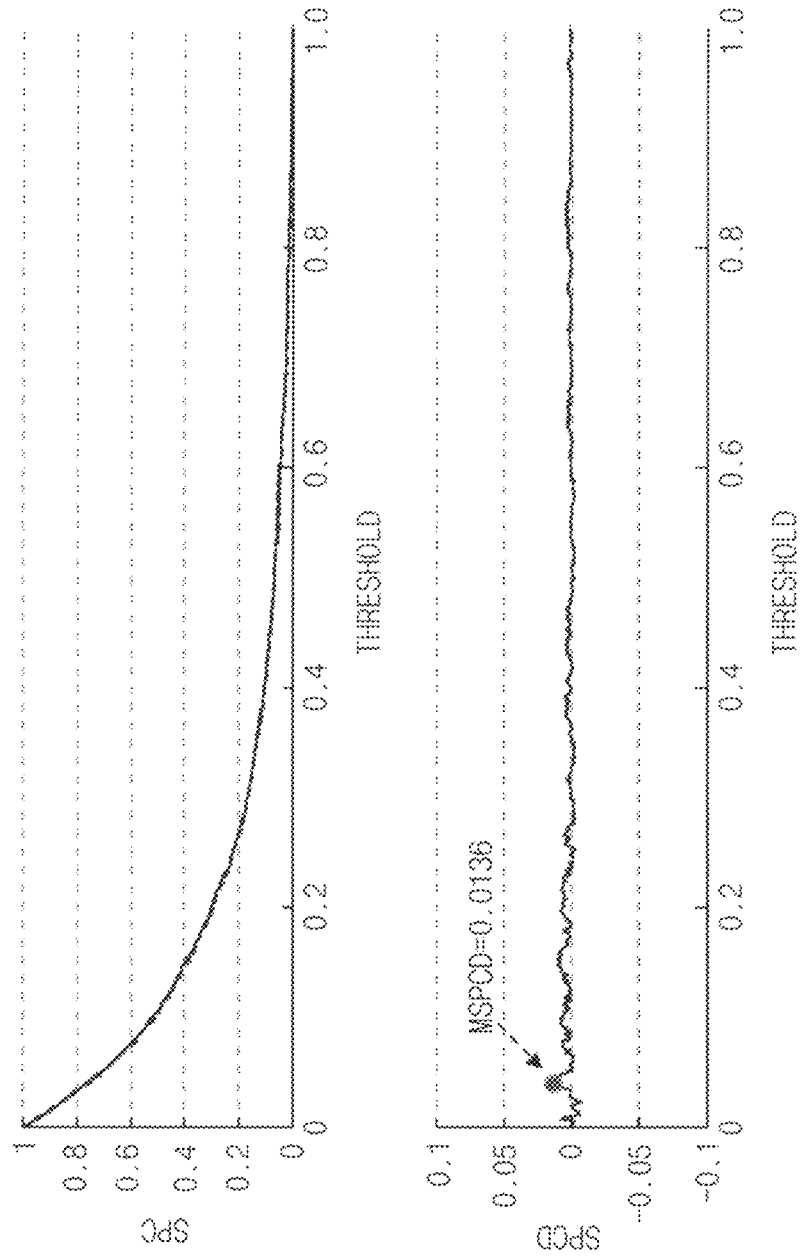
Figure 13B:
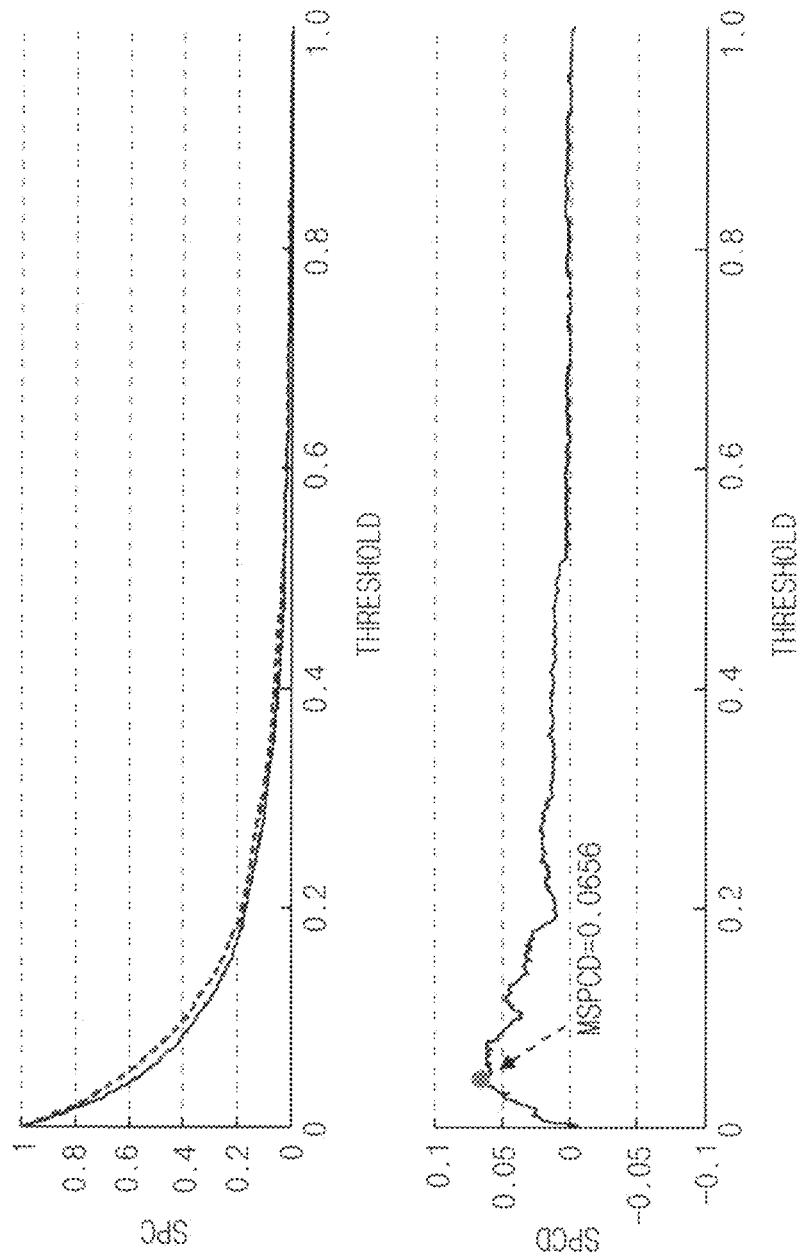

Referring to FIG. 13A, the variation of the sideband peak count value and the variation of the sideband peak count difference value according to the change of the threshold value T are illustrated in the first intact specimen AI1. Referring to FIG. 13B, the variation of the sideband peak count value and the variation of the sideband peak count difference value according to the change of the threshold value T are illustrated in the first damaged specimen AD1. In SPC curves of FIGS. 13A and 13B, a solid line represents the sideband peak count value obtained from the WB response, and a dotted line represents the sideband peak count value obtained from the WB+NB response.

As illustrated in FIG. 13A, there is almost no difference between the sideband peak count value obtained from the WB response and the sideband peak count value obtained from the WB+NB response in the first intact specimen AI1, and the maximum sideband peak count difference value is about 0.0136. However, as illustrated in FIG. 13B, the difference between the sideband peak count value obtained from the WB response and the sideband peak count value obtained from the WB+NB response in the first damaged specimen AD1 is relatively large, and the maximum sideband peak count difference value is about 0.0656.

Although not illustrated in FIGS. 13A and 13B, the sideband peak count value and the sideband peak count difference value were obtained for each of the second intact specimen AI2 and the second to fourth damaged specimens AD2, AD3 and AD4.

Figure 14:
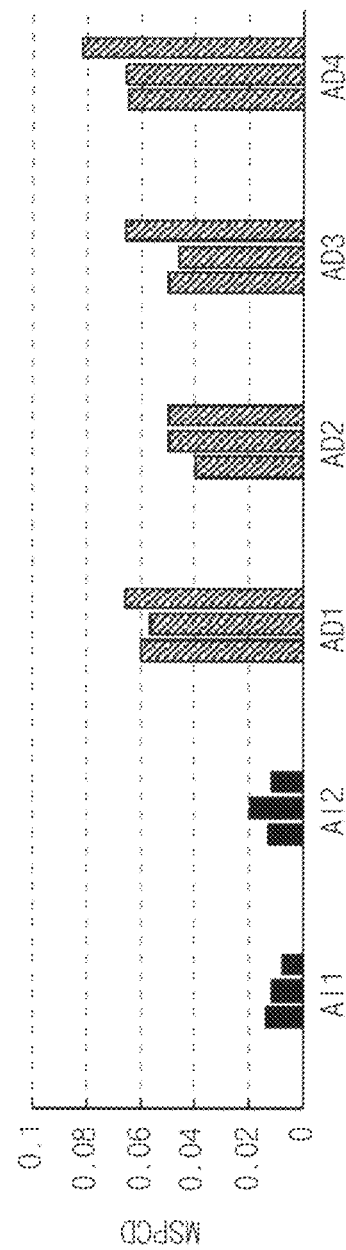

Referring to FIG. 14, the maximum sideband peak count difference values are illustrated in each of the intact specimens AI1 and AI2 and the damaged specimens AD1, AD2, AD3 and AD4. It may be shown that the maximum sideband peak count difference value of each of the damaged specimens AD1, AD2, AD3 and AD4 is always larger than that of each of the intact specimens AI1 and AI2, and thus it may be checked that the damage of the structure is able to be efficiently determined by obtaining the sideband peak count difference value according to example embodiments.

The above described embodiments may be applied to various safety inspection or diagnosis systems and/or measurement systems for maintenance that evaluate the current status of various target structures such as general buildings, specimens and samples, as well as infrastructure facilities such as bridges, large facilities and underground facilities.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of inspecting a structure, the method comprising:
    receiving a first ultrasonic signal generated from a target structure by a first laser beam, the first ultrasonic signal being generated by providing the first laser beam generated from a first excitation unit to the target structure;
    receiving a second ultrasonic signal generated from the target structure by a second laser beam, the second ultrasonic signal being generated by providing the second laser beam generated from a second excitation unit to the target structure, the second excitation unit and the second laser beam being different from the first excitation unit and the first laser beam, respectively;
    receiving a third ultrasonic signal generated from the target structure by the first laser beam and the second laser beam, the third ultrasonic signal being generated by simultaneously providing the first laser beam and the second laser beam to the target structure; and
    determining whether the target structure is damaged based on a first ultrasonic frequency spectrum, a second ultrasonic frequency spectrum and a third ultrasonic frequency spectrum that are obtained by converting the first ultrasonic signal, the second ultrasonic signal and the third ultrasonic signal, respectively,
    wherein the first laser beam has a first size, and the second laser beam has a second size smaller than the first size,
    wherein, when the first laser beam and the second laser beam are provided in a circular shape on a plane, the first size of the first laser beam is represented by a first diameter, and the second size of the second laser beam is represented by a second diameter that is shorter than the first diameter, and
    wherein a narrowband input is generated by the first laser beam, and a wideband input is generated by the second laser beam.

2. The method of claim 1, wherein at least one of the first size and the second size is changeable.

3. A method of inspecting a structure, the method comprising:
    receiving a first ultrasonic signal generated from a target structure by a first laser beam, the first ultrasonic signal being generated by providing the first laser beam generated from a first excitation unit to the target structure;

receiving a second ultrasonic signal generated from the target structure by a second laser beam, the second ultrasonic signal being generated by providing the second laser beam generated from a second excitation unit to the target structure, the second excitation unit and the second laser beam being different from the first excitation unit and the first laser beam, respectively;

receiving a third ultrasonic signal generated from the target structure by the first laser beam and the second laser beam, the third ultrasonic signal being generated by simultaneously providing the first laser beam and the second laser beam to the target structure; and determining whether the target structure is damaged based on a first ultrasonic frequency spectrum, a second ultrasonic frequency spectrum and a third ultrasonic frequency spectrum that are obtained by converting the first ultrasonic signal, the second ultrasonic signal and the third ultrasonic signal, respectively, wherein determining whether the target structure is damaged includes:

selecting a frequency range based on the first ultrasonic frequency spectrum and the second ultrasonic frequency spectrum;

calculating a first sideband peak count value within the selected frequency range, the first sideband peak count value indicating a number of first threshold peak points that are greater than or equal to a threshold value among all first peak points included in the second ultrasonic frequency spectrum;

calculating a second sideband peak count value within the selected frequency range, the second sideband peak count value indicating a number of second threshold peak points that are greater than or equal to the threshold value among all second peak points included in the third ultrasonic frequency spectrum; and determining whether a fatigue crack is included in the target structure by comparing the first sideband peak count value with the second sideband peak count value.

4. The method of claim 3, wherein it is determined that the fatigue crack is included in the target structure when a sideband peak count difference value obtained by subtracting the first sideband peak count value from the second sideband peak count value is a positive value.

5. The method of claim 4, wherein a degree of damage of the target structure increases as the sideband peak count difference value increases.

6. The method of claim 3, wherein the threshold value is changeable.

7. An inspection system comprising:

a first excitation unit configured to generate a first laser beam;

a second excitation unit configured to generate a second laser beam, the second excitation unit and the second laser beam being different from the first excitation unit and the first laser beam, respectively;

a sensing unit configured to receive a first ultrasonic signal generated from a target structure by the first laser beam, to receive a second ultrasonic signal generated from the target structure by the second laser beam, and to receive a third ultrasonic signal generated from the target structure by the first laser beam and the second laser beam, the first ultrasonic signal being generated by providing the first laser beam to the target structure, the second ultrasonic signal being generated by providing the second laser beam to the target structure, the third ultrasonic signal being generated by simultaneously providing the first laser beam and the second laser beam to the target structure; and a control unit configured to determine whether the target structure is damaged based on a first ultrasonic frequency spectrum, a second ultrasonic frequency spectrum and a third ultrasonic frequency spectrum that are obtained by converting the first ultrasonic signal, the second ultrasonic signal and the third ultrasonic signal, respectively wherein the first laser beam has a first size, and the second laser beam has a second size smaller than the first size, wherein, when the first laser beam and the second laser beam are provided in a circular shape on a plane, the first size of the first laser beam is represented by a first diameter, and the second size of the second laser beam is represented by a second diameter that is shorter than the first diameter, and wherein a narrowband input is generated by the first laser beam, and a wideband input is generated by the second laser beam.

8. The inspection system of claim 7, wherein at least one of the first size and the second size is changeable by the control unit.

9. The inspection system of claim 7, wherein the control unit is configured to select a frequency range based on the first ultrasonic frequency spectrum and the second ultrasonic frequency spectrum, to calculate a first sideband peak count value within the selected frequency range, to calculate a second sideband peak count value within the selected frequency range, and to determine whether a fatigue crack is included in the target structure by comparing the first sideband peak count value with the second sideband peak count value, wherein the first sideband peak count value indicates a number of first threshold peak points that are greater than or equal to a threshold value among all first peak points included in the second ultrasonic frequency spectrum, and wherein the second sideband peak count value indicates a number of second threshold peak points that are greater than or equal to the threshold value among all second peak points included in the third ultrasonic frequency spectrum.

10. The inspection system of claim 9, wherein the control unit is configured to determine that the fatigue crack is included in the target structure when a sideband peak count difference value obtained by subtracting the first sideband peak count value from the second sideband peak count value is a positive value.

11. The inspection system of claim 10, wherein a degree of damage of the target structure increases as the sideband peak count difference value increases.

12. The inspection system of claim 11, wherein the threshold value is changeable by the control unit.

* * * * *